(12) United States Patent
Li

(10) Patent No.: US 9,607,311 B2
(45) Date of Patent: Mar. 28, 2017

(54) SYSTEM AND METHODS FOR CONDUCTING SURVEYS

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 213 days.

(21) Appl. No.: 14/298,880

(22) Filed: Jun. 6, 2014

(65) Prior Publication Data

US 2015/0356578 A1    Dec. 10, 2015

(51) Int. Cl.
*G06Q 30/02* (2012.01)

(52) U.S. Cl.
CPC ......... *G06Q 30/0203* (2013.01); *G06Q 30/02* (2013.01)

(58) Field of Classification Search
CPC .......................... G06Q 30/0203; G06Q 30/02
See application file for complete search history.

(56) References Cited

U.S. PATENT DOCUMENTS

| | | | | |
|---|---|---|---|---|
| 4,847,685 A * | 7/1989 | Gall | ..................... | H04H 60/59 725/14 |
| 5,893,098 A * | 4/1999 | Peters | ..................... | G06Q 30/02 |
| 6,175,833 B1 * | 1/2001 | West | .................. | G06Q 30/0601 434/323 |
| 6,311,190 B1 * | 10/2001 | Bayer | ..................... | G06Q 30/02 |
| 7,912,898 B2 * | 3/2011 | Gold | ..................... | G06Q 30/02 709/203 |
| 7,941,751 B2 * | 5/2011 | Ebert | ..................... | G06Q 30/02 715/730 |
| 7,962,359 B2 * | 6/2011 | Montoya | ................ | G06Q 30/02 705/7.32 |
| 8,515,803 B2 * | 8/2013 | Meyer | .................... | G06Q 10/00 705/7.38 |
| 2010/0306024 A1 * | 12/2010 | Ryan | ..................... | G06F 3/0482 705/7.32 |

* cited by examiner

*Primary Examiner* — Michael Zarroli

(57) ABSTRACT

Embodiments introduced utilize one action to complete multi-event survey or multiple surveys simultaneously. In addition, users are awarded with benefit for doing surveys. Awards from different surveys may be added together for redemption of a product or gift.

20 Claims, 5 Drawing Sheets

SYSTEM AND METHODS FOR CONDUCTING SURVEYS

FEDERALLY SPONSORED RESEARCH

Not applicable

SEQUENCE LISTING OR PROGRAM

Not applicable

BACKGROUND

Field of Invention

This invention relates to conducting surveys, more particularly to conducting multiple surveys simultaneously using one action.

Description of Prior Art

Customer surveys are important for all kinds of business. Surveys on social or political issues are also important for policy makers as well as the general public. For business, survey results may be used to monitor customer service, improve product quality, obtain early warnings, observe future trends, etc. Conventional surveys use a questionnaire that includes multiple questions. The questions are often long and not easy to comprehend, and they often occupy several pages. No matter whether a questionnaire is on paper or on a screen, most people just shy away from it because, it is considered burdensome and intrusive. In many cases, only the allure of a prize may make people participate in surveys.

When there are multiple surveys, it would be more efficient and timesaving if the surveys could be completed together in a way like doing a single survey. But since conventional surveys have complex questions and answers, it is impossible to address multiple surveys simultaneously. For instance, answers of conventional survey may include options "extremely satisfied", "satisfied", "neither satisfied nor unsatisfied", "unsatisfied", and "extremely unsatisfied". Assume that there are two events to be surveyed. If they could be addressed simultaneously by one action, it would mean that the events have the same answer out of five options, which seems impractical. As a consequence, surveys have to be conducted one by one in a tedious and time-consuming process. The trouble grows bigger when there are more events.

Due to the reluctance and dislike towards surveys, various awarding schemes are created to incentivize survey participants. One of the often used schemes is to arrange a raffle where incentivizing prizes are drawn. But the odds of winning in a raffle are so slim most people would ignore it. On the other hand, if a prize is for every participant, its value is often low, as it costs a lot given the sheer quantity of prizes. Obviously, a prize of small value is not attractive either. Thus, current awarding methods are considered weak and ineffective.

Therefore, there exists a need for a survey system and method which provides easy and less intrusive surveys, addresses multiple events or surveys simultaneously, and arranges effective awarding schemes.

The word "event" as noun is referred broadly as something which physically or virtually happened, is happening, or may happen, and is suitable for conducting surveys. Examples include, but not limited to, shopping, dining, gaming, travelling, service, a class in school, a concert or ritual, political, cultural, religious or sport activities, political, cultural, religious issues and policies, or other personal or collective phenomena. The start of an event may be the beginning of an activity, or the appearance of a subject or issue. Other examples may include the beginning of a shopping activity, the announcement of a policy, the publication of a personal, organizational, or national plan, or the occurrence of any other phenomena. For some long-lasting issues such as attitude towards marriage, education, or politics, the event starting time may be long time ago. The end of event may mean a conclusion, closing, ending, withdrawal, or disappearance.

OBJECTS AND ADVANTAGES

Accordingly, several main objects and advantages of the present invention are:

a). to provide an improved system and method to conduct surveys;

b). to provide such surveys which are quick, convenient, and less intrusive;

c). to provide such surveys which are completed simultaneously by one action;

d). to provide such surveys which address multiple events simultaneously with one action; and e). to provide such surveys which award participants with addible financial gains.

Further objects and advantages will become apparent from a consideration of the drawings and ensuing description.

SUMMARY

In accordance with the present invention, a single action may be designed to address multiple events or complete multiple surveys simultaneously. The 1-action multi-event survey or 1-action multiple surveys are more productive and efficient compared to doing them one by one. As a result, a user may quickly finish lots of surveys on a routine base, and surveys on various daily events may become part of the life. Furthermore, users may earn points for doing survey as an incentive. The points may be added up and spent for "buying" or exchange of a product or gift.

DRAWING FIGURES

Figure 3:
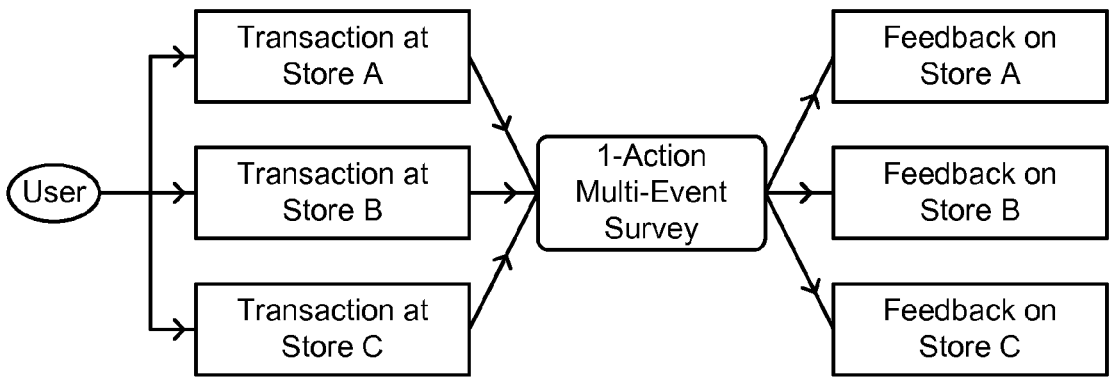
Figure 4:
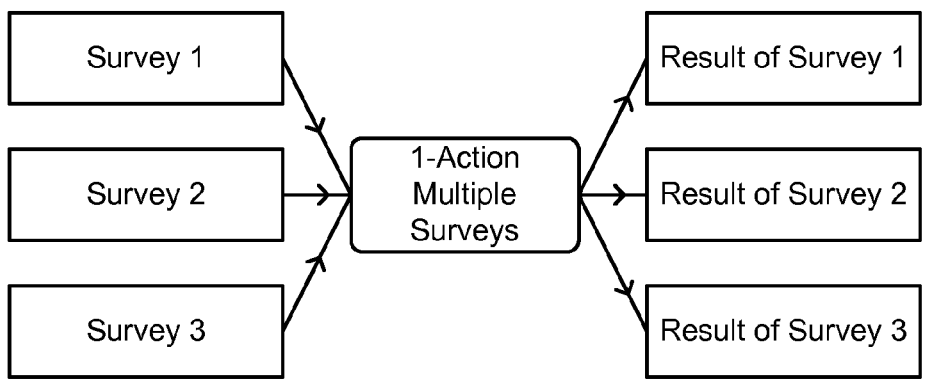

FIGS. 3 and 4 are flow diagrams depicting 1-action multi-event survey and 1-action multiple surveys respectively in accordance with the present invention.

Figure 5:
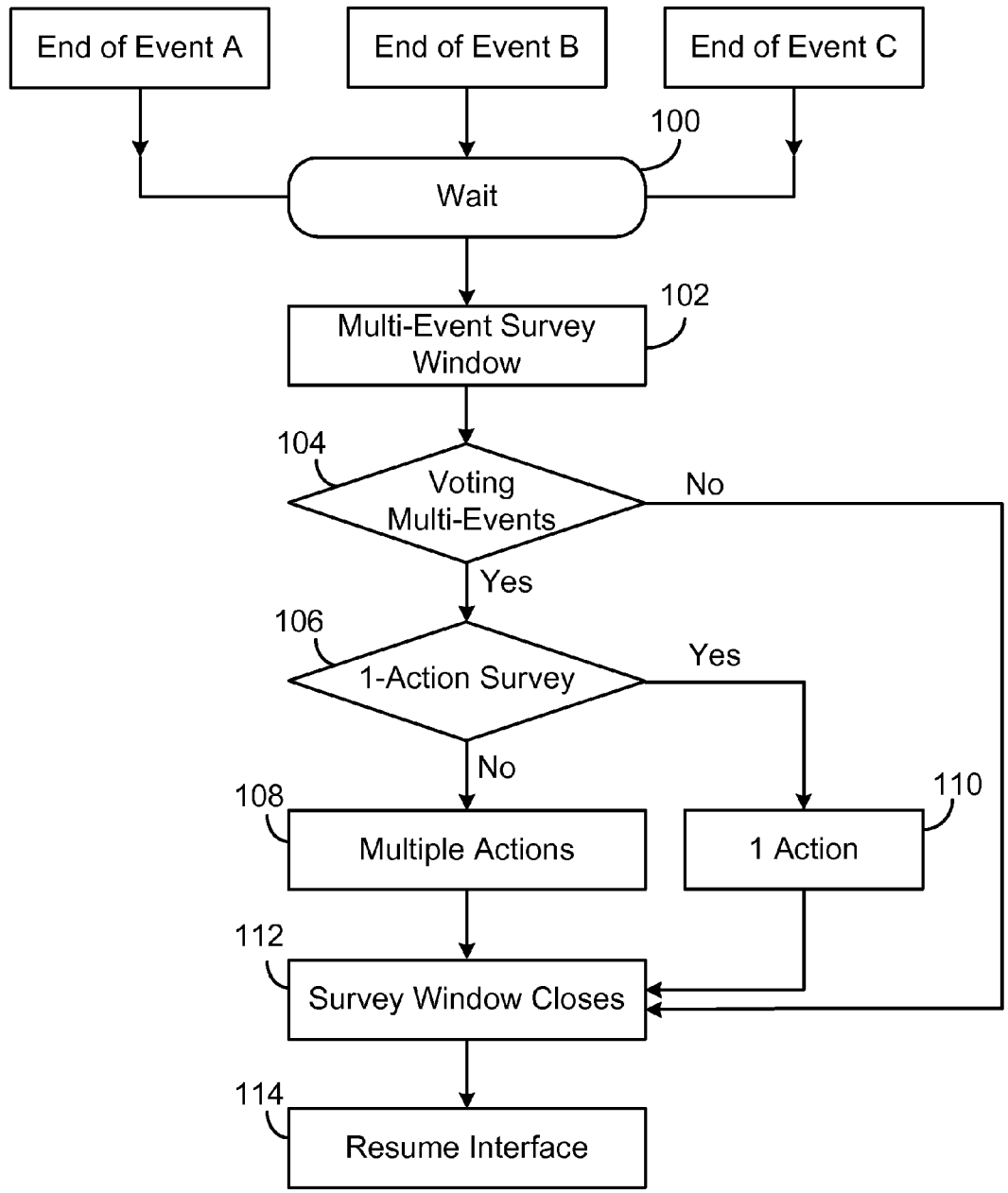
Figure 6:
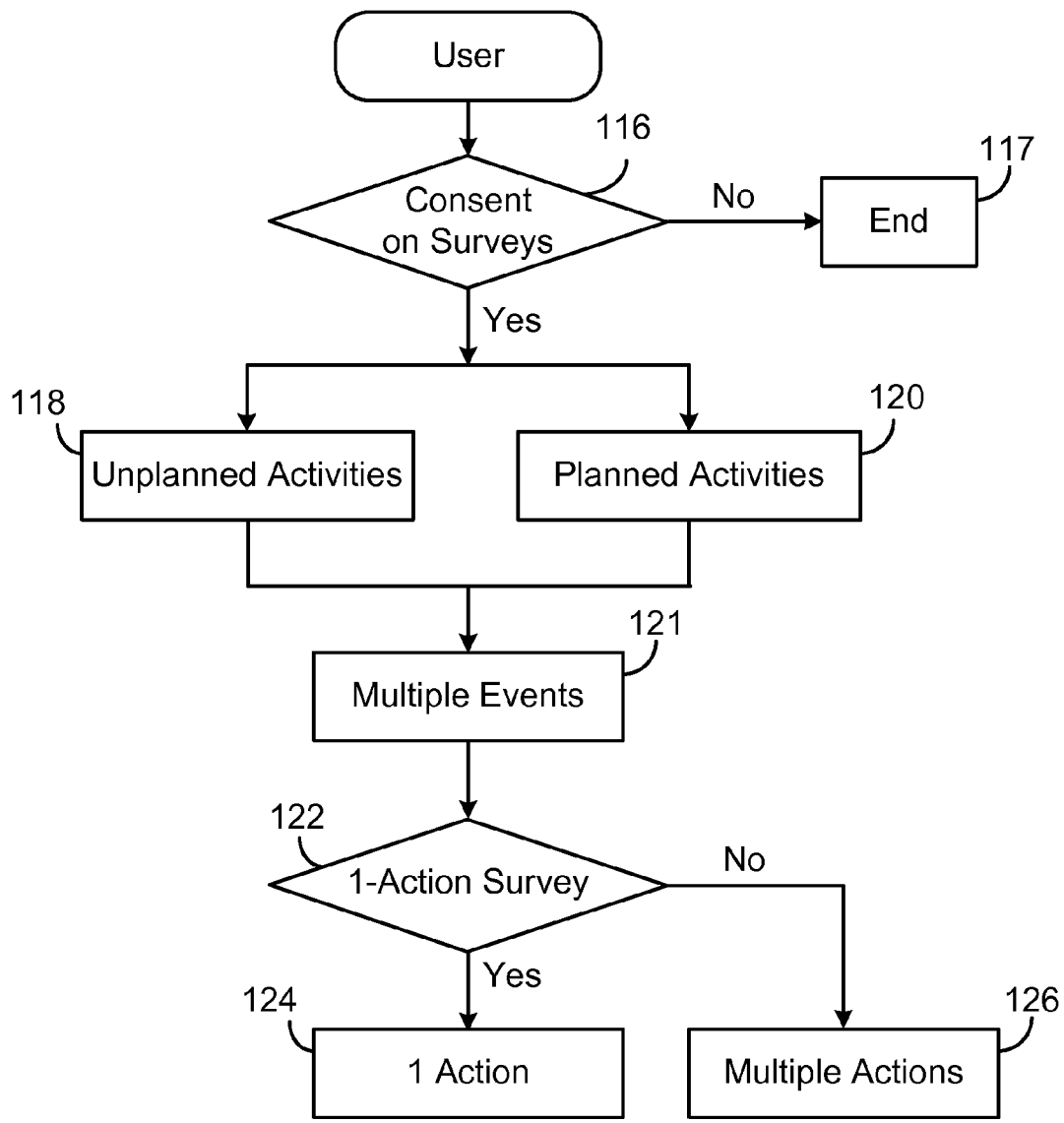

FIGS. 5 and 6 are flow diagrams depicting surveys for multiple events in accordance with the present invention.

Figure 7:
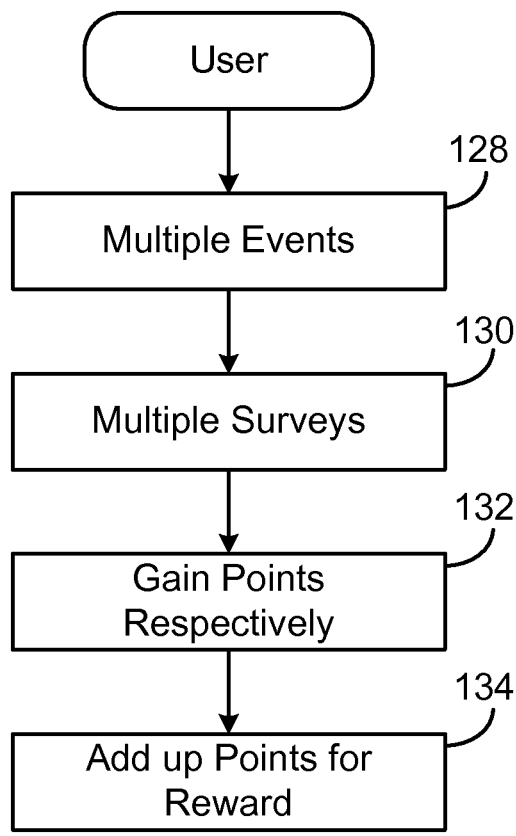

FIG. 7 is a flow diagram illustrating awarding method in surveys in accordance with the present invention.

Figure 8:
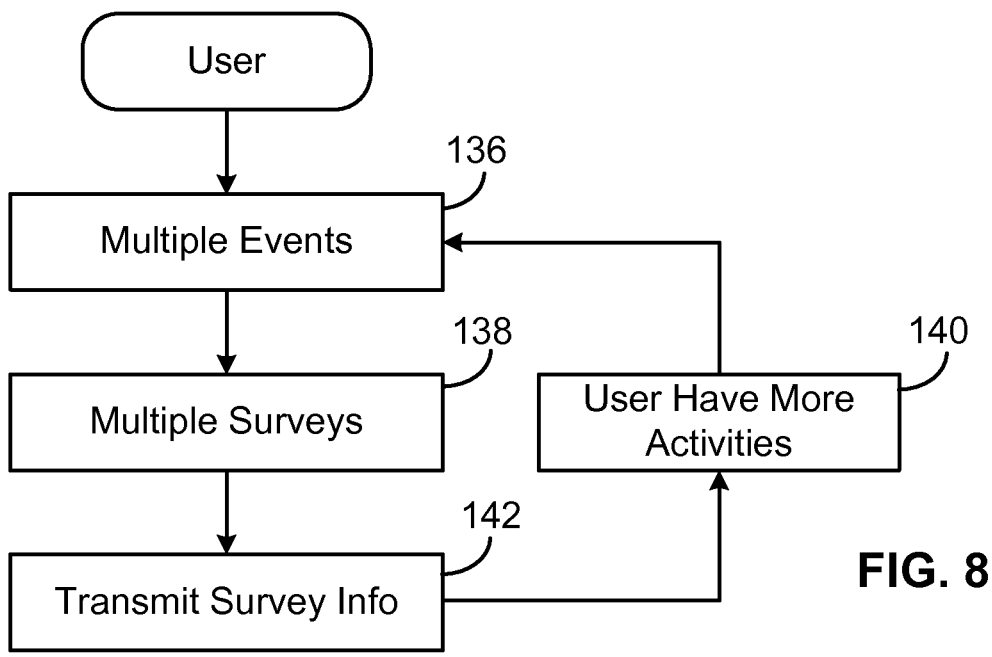

FIG. 8 is a flow diagram illustrating a survey embodiment in accordance with the present invention.

| REFERENCE NUMERALS IN DRAWINGS | | | |
|---|---|---|---|
| 10 | Client System | 12 | Survey Database |
| 14 | Communication Network | 16 | Processor |
| 18 | Processing Module | 20 | Log Database |
| 22 | Computer Readable Medium | | |
| 24 | Close Button | 26 | Wait Button |
| 28 | Display Surface | 30 | Yes Button |
| 32 | No Button | 34 | So-So Button |

-continued

REFERENCE NUMERALS IN DRAWINGS

| 36 | Button | 38 | Button |
|---|---|---|---|
| 80 | Client System | 82 | Server System |
| 100-142 are exemplary steps. | | | |

DETAILED DESCRIPTION

Figure 1:
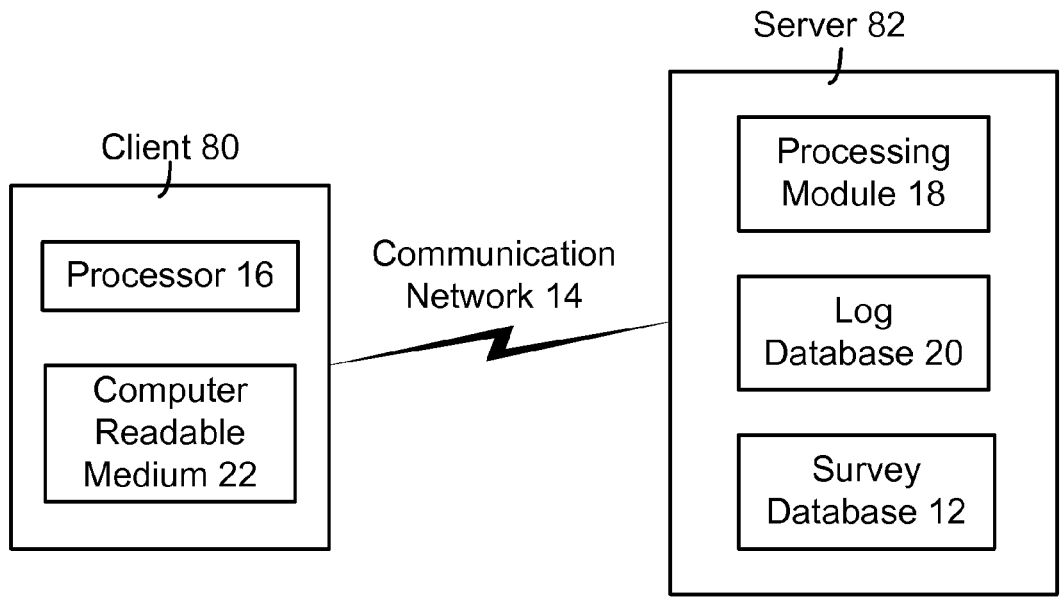
FIG. 1 is a block diagram describing one embodiment in accordance with the present invention.

FIG. 1 is an exemplary block diagram of one embodiment according to the present invention. A client system 80 and server system 82 are connected via a communication network 14. Client 80 may represent an electronic device, including but not limited to a desktop computer, a handheld computer, a tablet computer, a wireless gadget (such as mobile phone, smartphone, smart watch, wearable device, and the like), digital television (DTV), internet protocol television (IPTV), play station, etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., surfing on the Internet, playing video or music, electronic payment, social networking, sending and receiving messages, executing other applications, etc. Client 80 may also include input, output, and communication components, which may be individual modules or integrated with processor 16. Usually, client 80 has a display with a graphical user interface (GUI). The display surface may also be sensitive to touches, especially in the case of tablet computer, smart phone, or smart watch. Client 80 may also have a voice recognition component to receive and recognize audio input from a user.

The word "server" means a system or systems which may have similar functions and capacities as one or more servers. Main components of a server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, server 82 may represent one or more server entities that collect, process, maintain, and/or manage survey information and documents, conduct surveys, communicate with users, deliver information required by users, etc. Server 82 may exemplarily be divided into three blocks, represented by a processing module 18, a log database 20, and a survey database 12. Processing module 18 may include processing and communication functions. Log database 20 may store user ID information and survey ID information, which may be used to trace a survey that a user participated in. Survey database 12 may store survey results and other survey related information, such as information on the survey event. The databases may include a cluster of aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and server 82 may be connected to network 14 by various wired, wireless, optical, or other connections.

Figure 2:
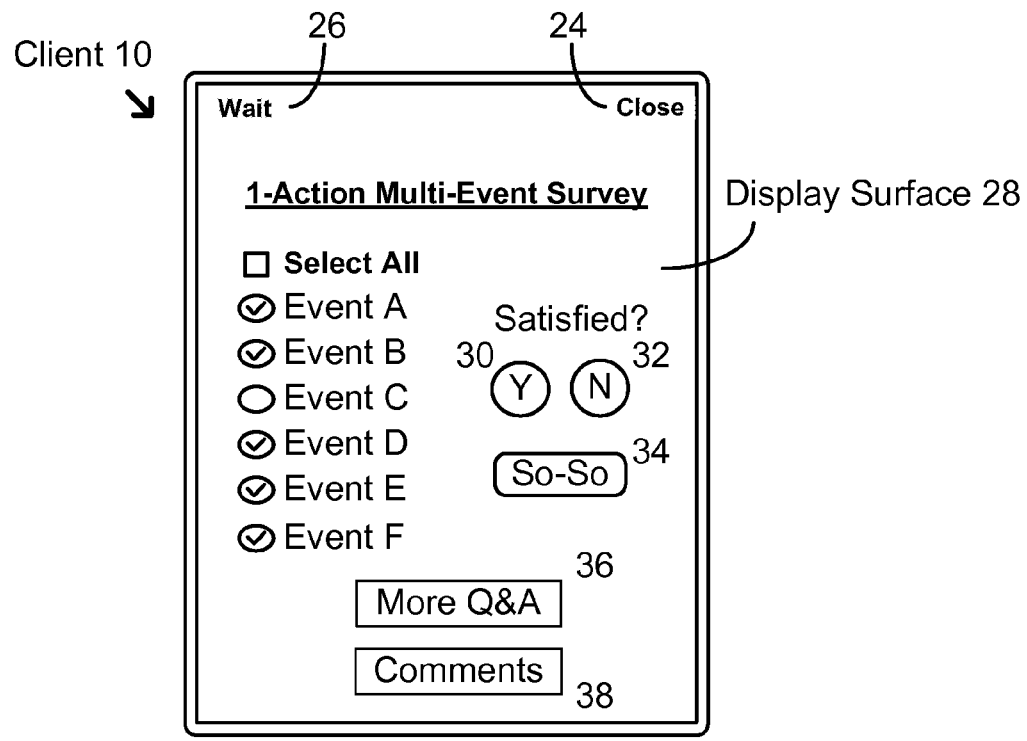
FIG. 2 is illustration of one embodiment in accordance with the present invention.

FIG. 2 is an exemplary diagram of a client system 10 for illustrating one embodiment of 1-action multi-event survey according to the present invention. Client 10, as an electronic device, has a display surface 28, where information, messages and graphic objects may be presented. Graphic objects may represent documents, applications, and functions, e.g., a textual file, photo album, browser, email, music, platform, etc. Display surface 28 is also a GUI by which a user may interact with a client system and/or a remote server. Surface 28 may be a touch screen or touchscreen, which is sensitive to a touch or touches. A graphic object on the GUI of a touch screen may be selected or activated by a click on a mouse or more conveniently, by a tap using finger tip.

The view on surface 28 of FIG. 2 may be considered as a survey window with a title "1-Action Multi-Event Survey". There are six events to be surveyed, from event A to event F. As aforementioned, events as used here may be personal, collective, or business related activities, a process or journey, issues of all kinds, or any phenomena. Examples of event may include, online shopping, in-store shopping, dining, service, gaming, show, sport, travel, educational, community, cultural or political policies, issues, and activities, and so on. In practice, an event description shown in a survey window may be made concise and clear, such as "Shopping at Fresh Market", "Service at Ed's Auto Body", "Lunch at Café Cozy", "New Recycling Policy", "Performance of Mayor Steve W. W. Harding", and so on.

There is a question "Satisfied?" beside the event list. This is the only question in the survey, easy to read and quick to comprehend. The question applies to all events.

Beneath the question, there are three graphic objects or three buttons 30, 32 and 34. The buttons correspond to "Y" or "Yes" (satisfied), "N" or "No" (not satisfied), and "So-So" (average) respectively. These are three answers for the survey question, as compared to five or seven answers in conventional surveys. The five conventional answers may be very good, good, average, bad, and very bad. However, such answer format is not only complex, but also impractical for 1-action multiple event survey.

In real life, users or consumers may be satisfied in many events or most events, e.g., when going shopping now and then around the town, which, after all, is what a business tries very hard to achieve every day. Consequently, answers for most surveys may be "Satisfied". A user may use "Select All" to choose all events on the list, and then click or tap the "Y" button to complete the surveys in one action. If for instance, a user doesn't like the experience of event C, the user may first select all, then uncheck it, and then click on "Y" button to address the rest five events simultaneously. However, 1-action multi-event survey would be impossible if there are two options, "Satisfied" and "Very Satisfied", because two actions or two rounds may be needed for the two answers, plus a user may have a hard time to distinguish a "Satisfied" event from a "Very Satisfied" event.

It is noted that the multiple event survey shown in FIG. 2 also represent multiple surveys, since each event may mean one specific survey. Thus, the scheme may be called 1-action multiple surveys, too, i.e. it takes one action to address or complete multiple surveys at the same time.

There are other graphic objects on the display screen. If a user doesn't want to take a survey, he or she may tap a "Close" button 24. There is also a "Wait" button 26 for users who need more time to decide. Tapping "Wait" button may keep the survey window open for an extended period of time. On the bottom, "More Q&A" button 36 and "Comments" button 38 are arranged. Button 36 may lead to a survey with conventional format like many questions and five or seven answer options, which some users may prefer. Tapping button 38 may open up a comment pad for users to post comments reflecting thoughts and feels.

The above described survey may get started by a user and it addresses multiple events through only one action. It is simple, swift, easy, and less intrusive and thus more likely to be accepted by users than a traditional survey. For example, after a user purchases a cup of coffee at a cafe, has hair cut at a barber shop, and sees a movie at a movie theater, the event info may be transmitted to a survey center by businesses, banks, or other financial institutions. Next, the survey center may send a message to the user's smartphone, assuming the phone is registered for surveys. An alert signal may appear on the smartphone's touch screen or GUI. The user may give a quick tap on the screen to open a survey window. Assuming everything is satisfactory, 1-action multi-event survey may be performed to cover all events at the same time.

Back to FIG. 1, a survey session may be processed by processor 16. Survey alert may be triggered by a survey application installed in the client system. Survey instructions may come from a survey center, a business which conducts or oversees an event, or another party which is informed of the event status. It is noted that a client system may or may not be involved in a target event. For example, a smartphone may be used for electronic payment and then for a survey later on. On the other hand, when a credit card is used for payment, and a smartphone is registered with a survey center, the smartphone may receive instructions to start a survey. Survey related information, including case ID, user ID, survey result, and event info, may be sent to server 82 by processor 16 via network 14. Server 82 may store case ID, survey results, and event info in survey database 12, and keep user ID and case ID in log database 20. Alternatively, survey related information may be transmitted to a local device which then relays the information to a remote server. In addition, processor 16 may send the survey related information to a local device which passes it to another database. For example, the aforementioned cafe may want to keep to itself the survey data collected from its customers.

It may be configured such that events are accumulated for surveys within a given time frame, which may be a couple of days or a week, or as long as it is convenient and practical for users.

Completing multiple events with one action may save a great deal of time and avoid a lot of hassles for users without compromising survey quality. Besides, it is also easy for users to start a conventional survey session by tapping button 36, or post comments by tapping button 38, if there is an urge to do so. There may be options available for users to revisit and revise survey answers within a period of time. The survey window shown here may be placed on display surface 28 of a smartphone, tablet computer, desktop computer, or other suitable devices. The survey window may be called out from an alert list or an icon, or show up by prearranged schedules.

FIGS. 3 and 4 depict survey embodiments by exemplary flow diagram according to the present invention. In FIG. 3, a user made purchases at store A, B, and C respectively. A survey center may obtain the transaction info and arrange a survey session via the user's smart phone, tablet computer, or another device. The user may go through a 1-action survey to address all events simultaneously. Next, the result may be transmitted to the survey center through communication networks. Feedback data on shops may be sorted and recorded at the center. FIG. 4 describes a similar scenario. A user may have experienced several events and may be presented with surveys 1, 2, and 3 through a survey center. A session may be arranged to handle all three surveys together. Then 1-action multiple surveys may take place. Results on three surveys may be obtained simultaneously. Finally, survey results and other related info may be sent to a survey database to get aggregated with data of respective groups.

FIG. 5 shows a schematic flow diagram of multi-event survey process in more details. Assume a user takes part in events A, B and C respectively. Going back to FIG. 1, after the events start or end, relevant info concerning the user and events is sent to server 82, which in turn transmits messages to the user's device, client system 80. As mentioned, client 80 may represent various electronic devices, including a smart phone or computer at home. Returning to FIG. 5, the messages may instruct client 80 to wait before starting a survey session, as in step 100. Next in step 102, either by user's act or a schedule, a survey window may be presented for the three events on a display of client 80. In step 104, the user may select to proceed with the survey or refuse it by closing the window. For the latter instance, step 112 happens, the session is concluded, and client 80's interface may resume its previous configuration in step 114. If no action is taken, the survey window may close by itself within a predetermined period of time. In such a case, the alert list remains unchanged, waiting to be called again by a user or prearranged schedule.

If a user moves ahead with the survey in step 104, he or she may choose 1-action method to complete three events simultaneously, as in step 110. In such a circumstance, it is presumed that the three events yield the same feedback answer and thus can be done together. The user may also choose to do step 108 for a conventional survey process, where traditional questions and answers are prepared, and thus multiple actions are needed. After the survey is done, the survey window is closed in step 112, and a prearranged or previous interface appears in step 114. When a survey is over, as a routine, client 80 may send survey related info to a survey center or server 82, which may be carried out by a suitable application or software familiar to those skilled in the art. It is noted that the more events involved in a survey, the more time saved for a user. But an overly prolonged accumulation period may cause issues due to faded memory and the complication of a large quantity of cases.

Before a survey gets started, it is appropriate or often required to get permission, authorization, or consent from a user. Especially when a survey is conducted by a third party, like a survey center who is not related to any event, a user may want to make sure that personal and survey related info would be used properly and within a limit. With consent of a user, surveys may be conducted without the need of getting permission every time. For example, a user may install an application at a smartphone or computer to set up a system for survey sessions. During the installation process, the user may be asked to give authorization to conduct surveys and to submit personal information for creating an account. The submitted information is then transferred to a facility of survey center, e.g., server 82 of FIG. 1. The info may be stored at database 20. Then after a user shows up in an event, like dining at a restaurant, the restaurant, under an agreement or contract, may send event and user info to a survey center, which in turn may send a message to a device registered with the user, and to prompt a survey session, or add one more event to a survey list prepared for the user. As almost all businesses may be inclined to join a survey program for their own benefit, many events may be covered in surveys. And when surveys become easy, quick, and rewarding (as discussed in below), a user may take lots of surveys on lots of daily events.

Since many daily activities may become eligible events, a user may not know what event would happen in advance, but nonetheless may face it in a survey at a later time. For instance, a user may not foresee all stores in which he or she would make a purchase before entering a shopping mall. And for every transactions made at the mall, the user knows it would show up on a survey list. Thus for a user, there are always some events which may happen without any plan; but once an event takes place, the user knows a corresponding survey would follow. This feature differentiates it from conventional surveys, where a user either knows a future event and survey are bundled, or doesn't have any knowledge of survey when taking part in an event.

FIG. 6 is an exemplary flow diagram of one embodiment according to the present invention, which covers user authorization and events with and without schedules. First in step 116, a user gives permission, authorization, or consent to a survey service, including allowing a third party to get necessary information about the user and event for survey purposes. For instance, user name, account ID, account password, and telephone number, are among the information to be collected. If a user refuses to give consent, the process comes to an end in step 117. If a user agrees with the requirement and conditions and wants to do surveys, consent and other info are sent to the service. Later on, the user may go through two types of event. In step 120, events or activities are planned in advance. For example, a user may have schedules for grocery shopping at a particular supermarket before setting off from home. In step 118, events to be encountered are not planned or even not aware before it happens. For instance, for a previously undecided shopping act, or impromptu buying spree, a shopping or event schedule doesn't exist. Because a user is enrolled in a survey program after submitting authorization and completing a registration process, he or she knows a survey would happen after an event starts or ends, no matter whether or not the event is known to the user in advance. Accordingly afterwards, a multi-event survey session may begin at the user's device in step 121, and the user may choose how to do it in step 122. In step 124, a 1-action survey is provided for a quick process, while step 126 means old-fashioned survey procedures which require multiple actions in a complex process.

FIG. 7 shows a schematic flow diagram of another embodiment, which describes an awarding scheme, according to the present invention. For instance, it may be designed such that users are awarded financially every time a survey is performed. The award, for example, may be of addible points. The amount of point for each event may be decided by an event owner, e.g. a business owner, or by a survey center which provides the service. Points may be redeemable for a product or gift. Event owners may be responsible for point redemption collectively, as the redemption may take points from several events. For instance, a user may participate in multiple events in step 128, complete multiple surveys in step 130, and gain rewarding points in step 132. In step 134, the points earned are added up, which may be redeemed.

Because of the resistance and difficulties to do surveys, a user rarely takes a survey to evaluate daily activities. In the practice of conventional surveys, participants are usually promised to have a chance to win a raffle prize, or are compensated by a small gift. The effect of raffle prize is limited. Small gift may be unattractive and yet costly to a business. Normally a user may take no more than one survey during a long time. If a user does complete a couple of surveys, the surveys are likely conducted by unrelated organizations. Therefore, it is out of the question or unrealistic to add up small awards of surveys. But when events to be surveyed happen on a daily basis, or happen many times a week, it becomes desirable to add up survey benefits together for a reward which cannot be redeemed with benefit from a single event. Therefore, step 134 introduces a method which encourages users to do more surveys, and to earn more points.

Another exemplary flow diagram of an embodiment is illustrated in FIG. 8. Again, a user goes through multiple events in step 136, and completes multiple surveys in step 138. Then in step 142, survey related info is transmitted to a survey database, like database 12 and 20 of FIG. 1. Next the events-surveys-info-transfer process may repeat itself as time goes by and the user starts additional activities in step 140, which leads to more events. Currently, most events are not associated with surveys, and when they are associated, users have no knowledge of that until getting a survey invitation. However, when surveys become ubiquitous and a norm, most events are included in surveys as long as a user is registered with a survey service provider, and thus there is no need to schedule a survey ahead of time. Readiness of survey session may depend upon events. Once events occur, surveys may be arranged by a survey center automatically. Events, on the other hand, depend upon user activities, since users' activities create events. The mechanism is reflected by steps 140, 136, and 138. The cycle may keep going with no need of further instructions, which is yet another feature conventional surveys clearly lack.

CONCLUSION, RAMIFICATIONS, AND SCOPE

Thus it can be seen that systems and methods are introduced for conducting improved surveys.

The improved surveys have the following main features and advantages:

(1). 1-action is used to address multiple survey events simultaneously;

(2). 1-action is used to complete multiple surveys simultaneously;

(3). Users are awarded by addible benefits for doing surveys.

Although the description above contains many specificities, these should not be construed as limiting the scope of the invention but as merely providing illustrations of some of the presently preferred embodiments. Numerous modifications will be obvious to those skilled in the art.

Ramifications:

Events to be surveyed may also include experience which is very personal for a user, such as experience or feels of a certain period of personal life, a certain period of family life, cultural or religious custom, and so on. For instance, a survey may be held on feels of a personal habit, like smoking, which is personal but reflects a social aspect, or experience of a spiritual activity.

Survey question may also be "Agree?" for event topics on issues, policies, attitude, etc. For instance, if an event is "Shopping at Store A", question "Satisfied?" is suitable. But if it is "0.1% Sales Tax Hike for School Improvement" or "Proposal to Build New Bridge", "Agree?" may be the right question. Alternatively, if events contain both experience and attitude topics, "Satisfied or Agreed?" may fit the need, as it is still concise and easy to understand, and easy to answer with yes, no, and so-so.

Besides click and tap, vocal instructions may also be used to select events and choose an answer, if a user's device is equipped with a voice recognition system. Thus a user may speak to a device to complete a survey session.

Lastly, various smartphone positioning technologies may be utilized to qualify a user for a survey. For instance, once it is detected that a user's device enters the perimeter of a venue, such as a park, zoo, entertainment site, seminar room, concert hall, the info may be transmitted to survey center. Then the user may be enrolled in a survey on his or her experience at the venue.

Therefore the scope of the invention should be determined by the appended claims and their legal equivalents, rather than by the examples given.

The invention claimed is:

1. A system arranged for working with an apparatus having a display and stored executable instructions, comprising:
    A) communication component for enabling communication between said system and a survey center via an electronic device or a communication network;
    B) survey means for presenting a survey session to a user, said survey means configured such that said display shows simultaneously a plurality of surveys arranged for a plurality of events respectively;
    C) said survey means configured such that said display presents a question and a plurality of graphic objects representing answers for conducting said plurality of surveys;
    D) said system arranged such that reception of one of said answers which is submitted by said user at said system causes simultaneous completion of said plurality of surveys; and
    E) said system arranged such that a survey result is transmitted to said survey center via said electronic device or said communication network.

2. The system according to claim 1 wherein said plurality of surveys is selected by said user respectively.

3. The system according to claim 1, further including an award scheme to incentivize said user based on completion of said plurality of surveys.

4. The system according to claim 1 wherein part of said plurality of surveys is caused by impromptu activities of said user.

5. The system according to claim 1 wherein said question is arranged related to user satisfaction.

6. The system according to claim 1 wherein said survey session is arranged to provide a working space on said display for said user to enter own words.

7. The system according to claim 1 wherein said answers contain a positive reply, a negative reply, and a neutral reply.

8. A computer implemented method performed for conducting a survey session comprising:
    A) arranging communication between a first device and a survey center via an electronic device or a communication network, said first device having a display and stored executable instructions;
    B) presenting said survey session to a user, said survey session including a plurality of surveys arranged for a plurality of events respectively;
    C) displaying on said display a question and a plurality of graphic objects representing answers for conducting said plurality of surveys;
    D) concluding said plurality of surveys simultaneously after said user submits one of said answers; and
    E) transmitting a survey result to said survey center via said electronic device or said communication network.

9. The method according to claim 8, further including obtaining user selection of said plurality of surveys.

10. The method according to claim 8, further including incentivizing said user by award based on completion of said plurality of surveys.

11. The method according to claim 8 wherein part of said plurality of surveys is caused by impromptu activities of said user.

12. The method according to claim 8 wherein said question is arranged related to user satisfaction.

13. The method according to claim 8 wherein said survey session is arranged to provide a working space on said display for said user to enter own words.

14. The method according to claim 8 wherein said answers contain a positive reply, a negative reply, and a neutral reply.

15. A computer implemented method performed for conducting a survey session comprising:
    A) arranging communication between a first device and a survey center via an electronic device or a communication network, said first device having a display and stored executable instructions;
    B) presenting said survey session to a user, said survey session including a plurality of surveys arranged for a plurality of events respectively;
    C) displaying on said display a question and said plurality of surveys for said user to select;
    D) showing on said display selected surveys after said user makes selections;
    E) concluding said selected surveys simultaneously after said user answers said question; and
    F) transmitting a survey result to said survey center via said electronic device or said communication network.

16. The method according to claim 15, further including incentivizing said user by award based on completion of said selected surveys.

17. The method according to claim 15 wherein part of said plurality of surveys is caused by impromptu activities of said user.

18. The method according to claim 15 wherein said question is arranged related to user satisfaction.

19. The method according to claim 15 wherein said survey session is arranged to provide a working space on said display for said user to enter own words.

20. The method according to claim 15, further including presenting a plurality of answers for said question.

* * * * *